July 27, 1965  G. A. A. HOULTON  3,197,229
STEERING ARRANGEMENT FOR LOAD-CARRYING VEHICLES
Filed June 18, 1962  5 Sheets-Sheet 4
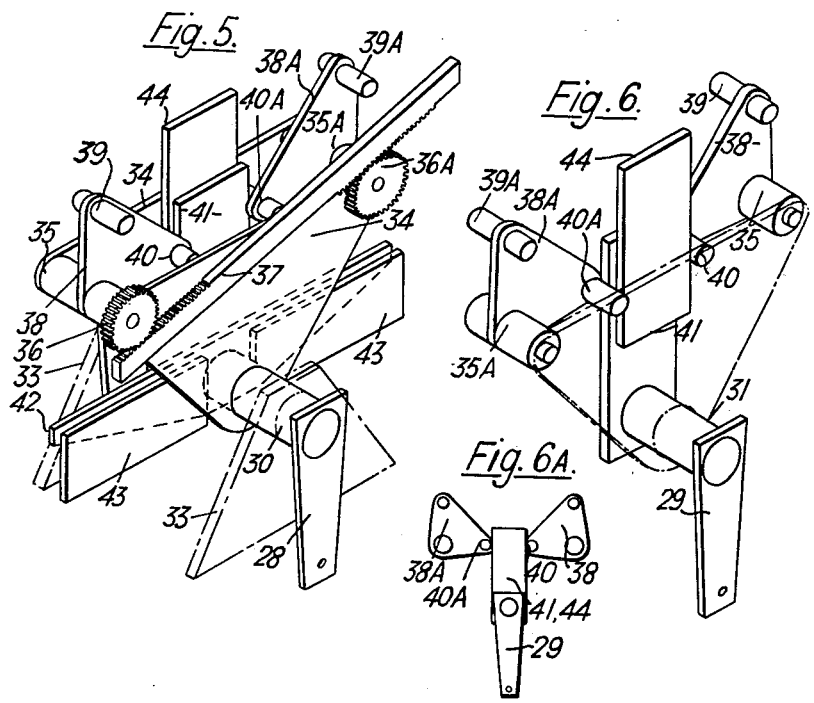
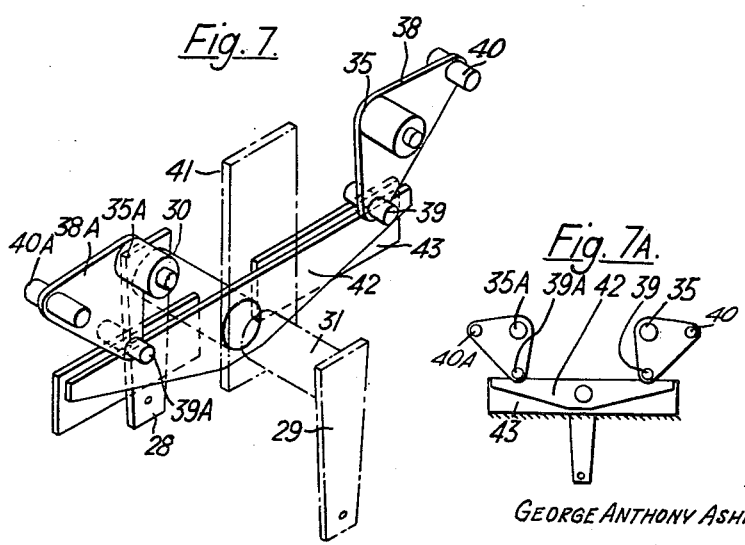
Inventor
GEORGE ANTHONY ASHLEY HOULTON
By Young & Thompson
Attorneys

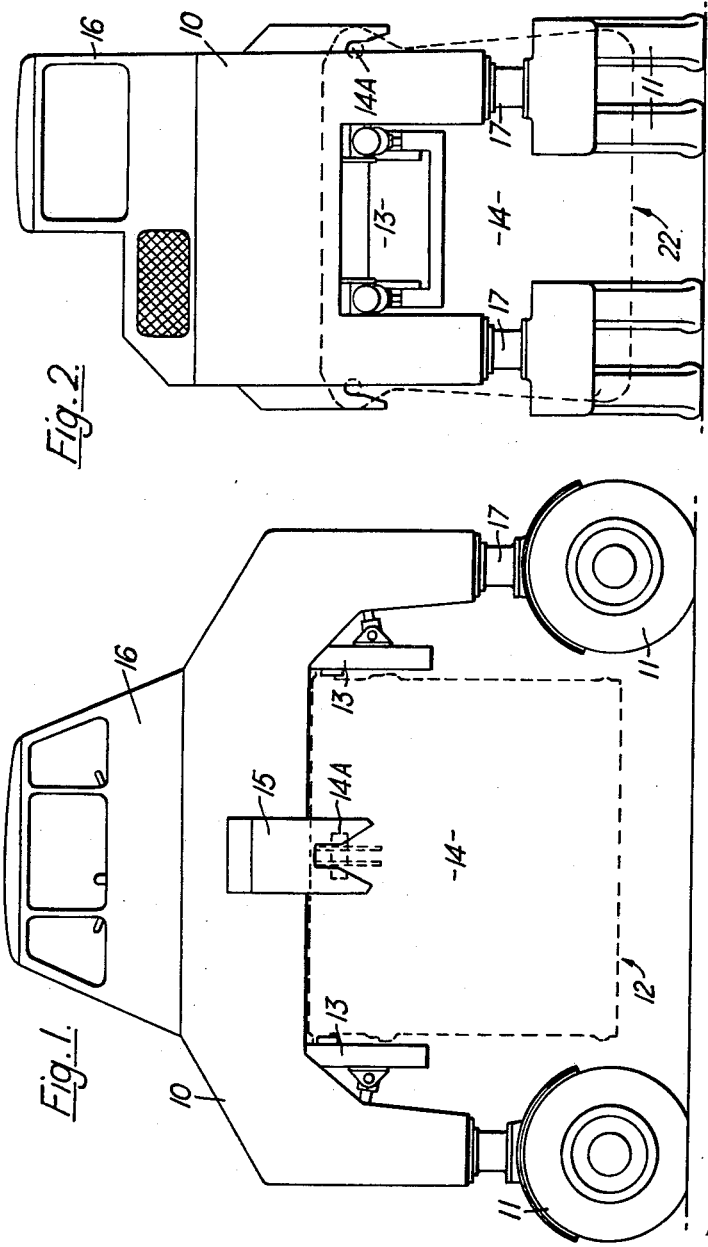

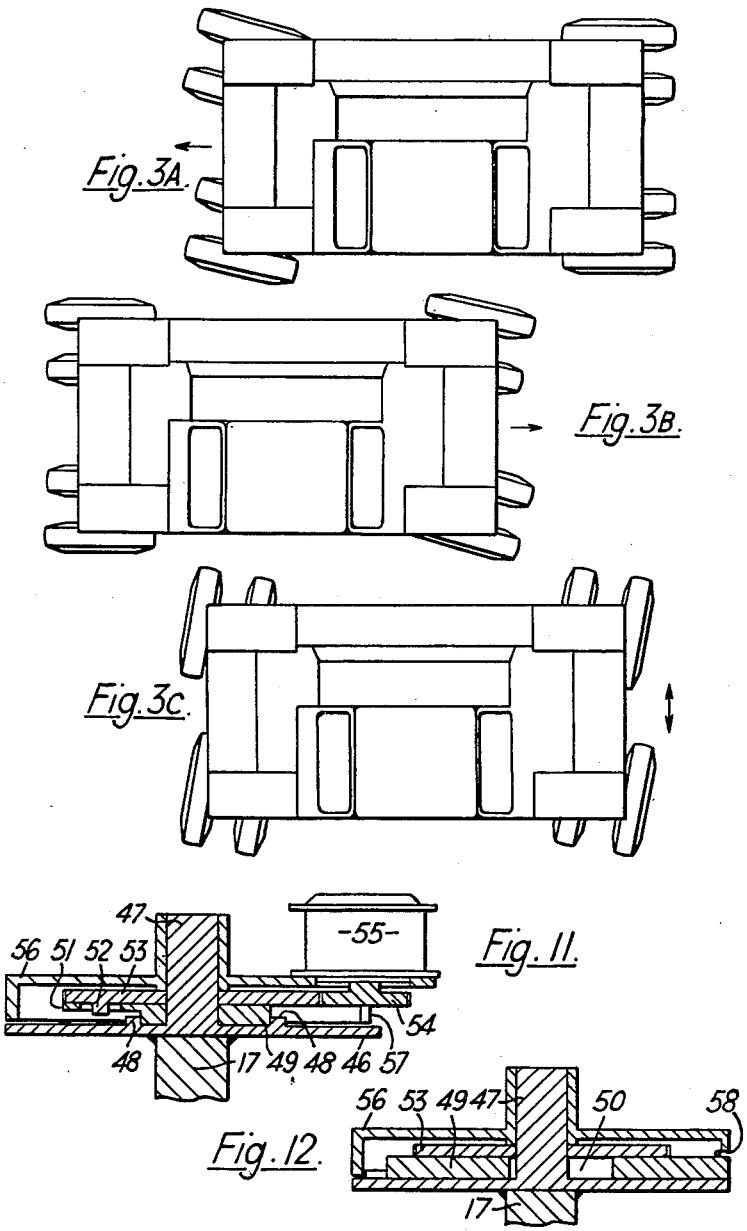

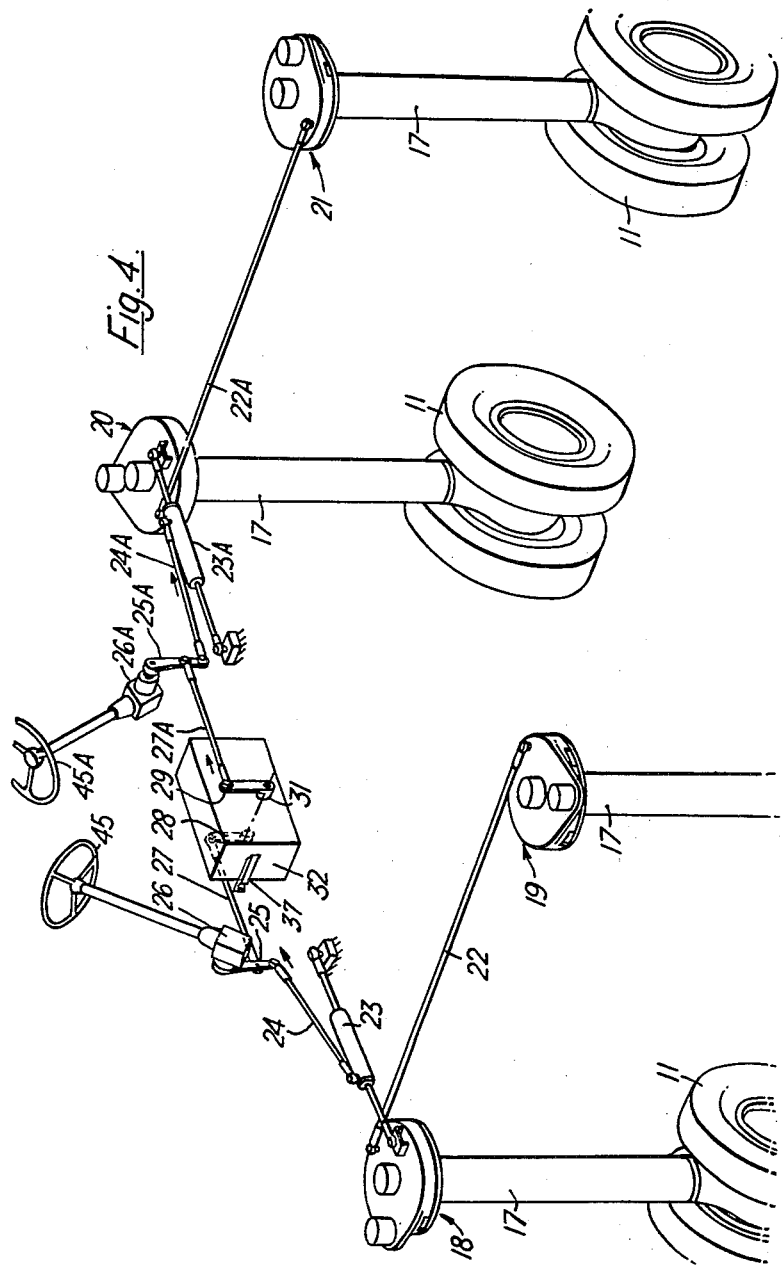

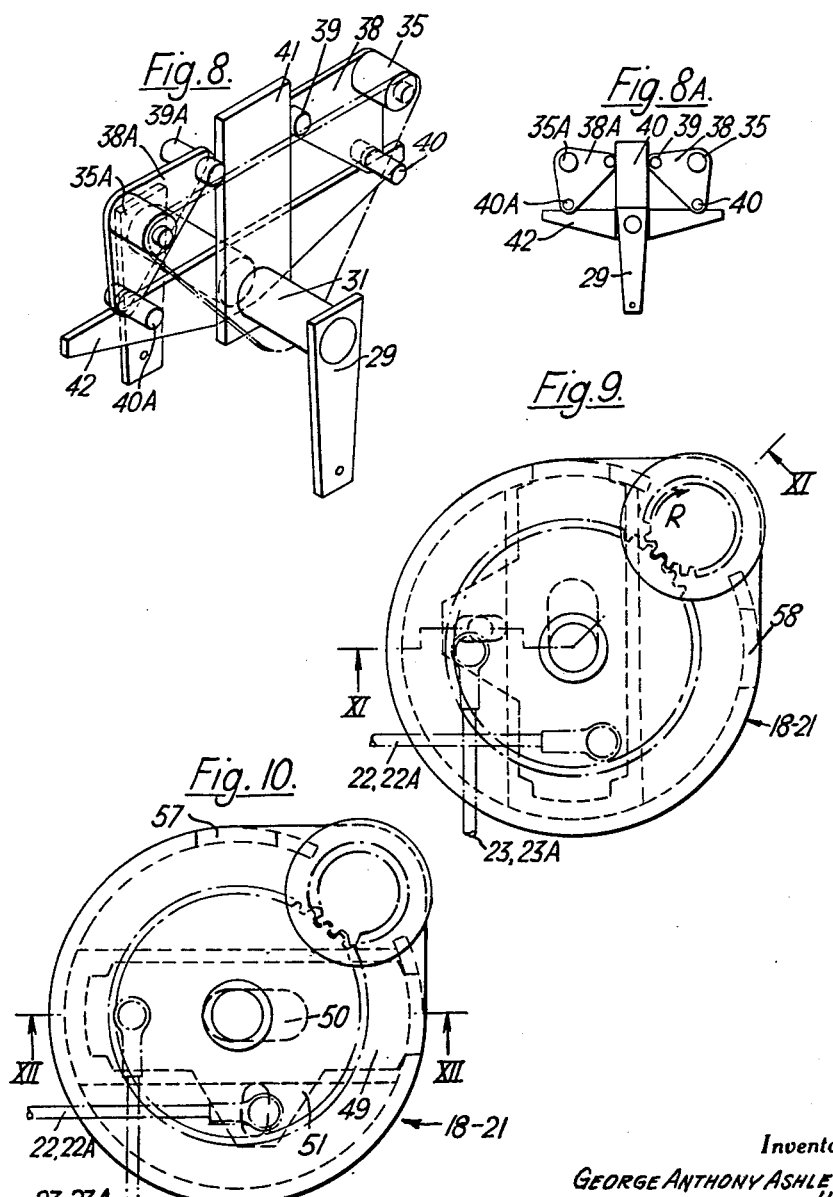

United States Patent Office
3,197,229
Patented July 27, 1965

3,197,229
STEERING ARRANGEMENT FOR LOAD-
CARRYING VEHICLES
George A. A. Houlton, Belfast, Northern Ireland, assignor
to British Straddle Carrier Company Limited, Belfast,
Northern Ireland, a British company
Filed June 18, 1962, Ser. No. 203,058
Claims priority, application Great Britain, June 16, 1961,
21,844/61
5 Claims. (Cl. 280—91)

This invention relates to load-carrying vehicles of the type having a raised body or platform supported by four corner ground-engaging wheels or sets of wheels, and depending lift means, so that the vehicle can straddle a load, suspend same under the body or platform and transport it. This type of vehicle is generally known, and is hereinafter and in the claims referred to, as a "straddle carrier vehicle."

The present invention is a straddle carrier vehicle in which the ground-engaging wheels are pivotal about vertical axes between a longitudinal position and a transverse position, and having a load aperture under the body of the vehicle, in which load-lifting means is mounted transversely to engage a load so that the vehicle can straddle the load by moving in a transverse direction, suspend the load in the load aperture, and then transport the load either transversely or longitudinally.

Preferably, the straddle carrier vehicle has four sets of ground-engaging wheels disposed in rectangular relation, each set comprising twin ground-engaging wheels contra-rotationally mounted on or separated by a vertical shaft.

Preferably also, diagonally opposite twin-wheels are differentially driven.

Preferably also, all sets of ground-engaging wheels are steerable and, preferably, either forward or rear pairs of wheels can be locked in the longitudinal position to provide two-wheel steering.

Preferably also, the steering is controlled via a steering selector mechanism comprising a pair of independently movable members one of which is connected to the mechanism to the front wheels and the other to the rear wheels, a pair of fixed members corresponding with the movable members, and movable stop members which when actuated, lock either one of the movable members relative to its corresponding fixed member, thereby to lock the corresponding pair of ground-engaging wheels against steering action and thus provide two-wheel steering, or lock both movable members relative to each other so that they move together, to provide four-wheel steering.

Preferably also, means for locating the ground engaging wheels in the longitudinal or transverse position comprises a pair of relatively rotatable coupled plates mounted on top of each vertical shaft, one plate being fixedly connected to the shaft (and having a spur gear), the other plate being fixedly mounted relative to the vehicle chassis and having power means which when operated, rotates the shaft plate and thus the shaft and its set of wheels and stop means for arresting movement of the shaft-plate when it reaches the longitudinal or transverse wheel-position.

The ground engaging wheels are steerable in the transverse position.

Preferably, the chassis of the vehicle is telescopic longitudinally so that the load aperture can be varied.

Preferably also, the straddle carrier vehicle is power driven and, preferably, the driving, steering, load lifting mechanism and load aperture controls are in close proximity to one another.

Preferably also, the controls are located in a cabin mounted on top of the body of the vehicle. Alternatively, the cabin may be mounted at the front end of the vehicle.

Preferably also, when the control cabin is mounted on top of the body, the vehicle can be driven in either longitudinal direction, and a duplicate set of controls is provided so that the operator may face the longitudinal direction of motion. Alternatively, when the control cabin is mounted at the front end of the vehicle, only the rear pair of wheels need by lockable in the longitudinal position.

The ground-engaging wheels, preferably diagonally opposite sets thereof, may be mechanically, electrically or hydrostatically driven.

An example of the present invention will now be described, by way of example, with reference to the accompanying drawings, in which:

FIG. 1 is a side elevation of a straddle carrier vehicle according to the invention, FIG. 2 is a corresponding front elevation, FIGS. 3A–3C are plan views of the vehicle showing various steering configurations, FIG. 4 is an illustrative perspective view of the steering mechanism, FIGS. 5–8 are perspective views of the steering selector unit, FIGS. 9 and 10 are plan views of the ground-engaging wheel locating mechanism, and FIGS. 11 and 12 are sectional elevations on the lines XI—XI of FIG. 9 and XII—XII of FIG. 10 respectively.

Referring firstly to FIGS. 1 and 2 of the drawings, a straddle carrier vehicle consists essentially of a substantially U-shaped body portion 10 housing power means (not shown) and supported by ground-engaging wheels 11 mounted at each corner of the body 10. A load aperture 12 is located under the body and between the front and rear wheels and a pair of longitudinally spaced transverse load-lifting members 13 are mounted at the forward and rear ends of the load aperture and inwardly of the ground-engaging wheels.

The load-lifting members 13 are actuated hydraulically to swing downwardly and inwardly to engage the load and lift same off the ground. A load 14 is shown in dotted outline suspended in position. Stabilizing brackets 15 are mounted on the side of the vehicle body if desired to engage the sides of the load or projections thereon, for example, where the load is a bucket having handles 14A.

A control cabin 16 is mounted on top of the body 10 from which the vehicle operator can control the engine, steering and load-lifting mechanism.

There are twin-ground-engaging wheels 11 at each corner of the body 10 mounted on and separated by a vertical shaft 17, and each shaft is axially rotatable by means to be hereinafter described. Thus, the twin-wheels can pivot contra-rotationally between a longitudinal position as shown for forward and reverse motion and a transverse position for sideways motion. The twin-wheels 11 may be differentially mounted on the shaft 17, and diagonally opposite sets of wheels 11 may be differentially driven.

The sets of twin-wheels 11 are coupled (as shown in FIG. 4) so that all four sets are steerable for manoeuvrability. Each vertical shaft 17 mounts a top horizontal disc 18–21 (to be hereinafter described in detail with reference to FIGS. 9 to 12) which when rotated via a steering linkage rotates its corresponding shaft. The linkage consists of two transverse track rods 22, 22A, one of which connects the forward pair of discs 18, 19 and the other of which connects the rear pair of discs 20, 21. One each of the forward and rear discs, for example 18 and 20, which are on the left hand side of the vehicle as viewed in FIG. 2, that is, the driver's side, are each connected to one end of a longitudinal servo-ram 23, 23A. The other end of each servo-ram 23, 23A is anchored to the vehicle chassis, and each servo-ram 23, 23A mounts a longitudinal link 24, 24A which is connected via a short substantially upstanding link 25, 25A to a steering box 26, 26A. Each short link 25, 25A is also connected by a longitudinal link 27, 27A to drop links 28, 29 which are mounted on shafts 30, 31 projecting transversely from a steering selector unit 32.

Referring now to FIGS. 5-8, the steering selector unit 32, is housed in a casing and includes, as hereinbefore mentioned, a pair of shafts 30, 31, each mounting a drop link 28, 29 at its outer end.

In FIG. 4 the drop links 28, 29 are shown upstanding but may alternatively be depending as shown in FIGS. 5-8 or they may be mounted in any suitable position on their corresponding shaft 30, 31.

The shafts 30 and 31 are rotatably mounted in support brackets 33 which are secured to the base of the casing and shaft 30 is spigoted into shaft 31 so that they are co-axial. However, each shaft is freely rotatable relative to the other. Each shaft 30, 31 pivotally mounts a rocker plate 34 which may conveniently be of inverted triangular shape and which are spaced transversely apart being pivotal on the shafts 30, 31 at their inverted apices. A pair of shafts 35, 35A are rotatably mounted between the base corners of the rocker plates 34 and each shaft 35, 35A has a pinion gear 36, 36A attached to one end projecting beyond one rocker plate 34. A rack 37 engages the pinion gears 36, 36A. Each shaft 35, 35A fixedly mounts a triangular cam 38, 38A by its apex and each cam 38, 38A has two pins 39, 40, 39A, 40A mounted at the base corners, such that one pin 39, 39A projects further to one side of its cam 38, 38A than from the other side, while the other pin 40, 40A is oppositely arranged.

The drop link shaft 31 has an upstanding rectangular plate 41 fixedly mounted normal thereto and which is pivotal in the longitudinal plane on rotation of the shaft 31. Shaft 30 has a long narrow inverted-triangular plate 42 fixedly secured thereto and which is also pivotal in the longitudinal plane on rotation of shaft 30.

A pair of horizontal rectangular plates 43 are fixedly mounted on the casing and lie adjacent the pivotal triangular plate 42, and a fixed vertical rectangular plate 44 is mounted adjacent the pivotal rectangular plate 41.

The selector mechanism is operated by movements of rack 37 which may be hydraulically operated and which causes the cams 38, 38A to pivot contra-rotationally about their shafts 35, 35A. By such movement:

(a) the pins 40, 40A can be made to abut the side edges of plates 41 and 44 (FIGS. 6 and 6A) to prevent pivotal movement of plate 41, or (b) the pins 39, 39A can be made to abut the top edges of plates 42 and 43 (FIGS. 7 and 7A) to prevent pivotal movement of plate 42, or (c) both sets of pins 39, 39A and 40, 40A can be made to abut their respective plates, simultaneously (FIGS. 8 and 8A) to prevent pivotal movement of plate 41 or 42 relative to each other.

Thus, it will be seen that in the FIG. 6A position the rear wheels are locked in the longitudinal position as only drop link 28 can be operated (by rotation of steering wheel 45), giving a two-wheel forward steering, FIG. 3A.

In the FIG. 7A position, the front wheels are locked in position as only drop link 29 can be operated (by rotation of steering wheel 45A) giving a two-wheel rear steering, FIG. 3B.

In the FIG. 8A position, the plate 41 is locked to plate 42 and thus, when either of drop links 28, 29 is operated, the complete mechanism within the casing pivots on the support brackets 33 so translating the movement to the other drop link to give four-wheel steering.

Referring now to FIGS. 9 to 12, which illustrate the means of rotating the ground-engaging wheels between the longitudinal and transverse positions; each disc 18-21 (FIG. 4) is of similar formation and consists of a lower circular plate 46 which is secured to the top of the vertical shaft 17. The plate 46 has a central upstanding projection 47 and a pair of parallel ridges 48 within which a slidable locking bar 49 is located normal to the centre line of the wheel axle. The bar 49 is of slightly smaller length than the diameter of plate 46 and has a central elongated aperture 50 through which projection 47 passes. The aperture 50 is of a length which allows movement of the bar 49 between positions where either end can be aligned with the periphery of the plate 46. The bar 49 also has a flange 51 which overlies one of the ridges 48 and which has a small transverse aperture therein. A projection 52 on a spur gear 53 engages in said aperture, which gear 53 is rotatable about projection 47 when actuated by a second spur gear 54 which is attached to a rotary actuator 55. Said actuator 55 is mounted on a top, stationary plate 56, which plate has a depending flange having a pair of circumferential apertures 57, 58 spaced 90° apart.

In operation, each rotary actuator rotates its spur gear 54, in the direction, for example of arrow R, FIG. 9. Such rotation causes spur gear 53 to rotate and as spur gear 53 is connected to locking bar 49 via projection 52, rotation of spur gear 53 causes the locking bar 49 to pull out of the slot in which it was located, for example, slot 57 of FIG. 9, to such an extent that the other end of bar 49 hits the inner face of the flange of the top plate 56. The locking bar 49, lower plate 46 and vertical shaft 17 then turn together with the spur gear 53 until the locking bar 49 comes opposite the slot 58 and engages therein to lock the pair of plates 46, 56 in the new position.

In practice, the four sets of wheels are rotated in a contra-rotational movement so that the vehicle does not tend to move in one particular direction but remains substantially stationary.

The vehicle can be driven in the forward or reverse directions with equal efficiency and duplicate controls are provided in the cabin so that the operator can face the desired longitudinal direction of motion.

The vehicle is also steerable when the twin-wheels are in the transverse position for manoevrability when straddling a load, the four sets of twin-wheels being turnable together about similar angles and directions to effect a crab-like movement, FIG. 3C.

When it is desired to transport a load, the straddle carrier vehicle is driven to the location, say in the conventional forward direction of motion. Alongside the load the vehicle stops and the wheels are pivoted to the transverse position. The vehicle straddles the load by moving in a transverse or sideways direction, and the operator may require to steer the vehicle into alignment with the load. The lifting members are actuated to grip the load at the front and rear, and suspend same under the body of the vehicle which can then be driven off in any desired direction, say for example, along a public road. The rear wheels are locked in the longitudinal position and the vehicle has two-wheel steering. Alternatively, the forward wheels may be locked in the longitudinal position and the vehicle driven in reverse.

The chassis of the vehicle may be telescopic longitudinally so that the load aperture can be varied.

The length of the load aperture may be varied by applying a braking action to the forward wheels and moving the rear of the vehicle towards or away from the forward part. Alternatively, the telescopic adjustment may be by means of hydraulic rams or other suitable means.

The load-lifting members may be flanged plates or hooks, and it may be necessary to have the load supported clear of the ground prior to straddling so that the flanges of the plates can engage under the bottom edges of the load.

The ground engaging wheels are mechanically driven but they may be electrically or hydrostatically driven.

In a modification (not shown) the control cabin is located at the front of the vehicle below or in line with the level of the body. In this case, the vehicle need not be adapted for travelling in the reverse direction, that is, only the rear pair of wheels can be locked in the longitudinal position and only one set of controls is provided. The vehicle can, of course, reverse in a manner similar to ordinary road vehicles.

Also, the straddle carrier vehicle may be in the form of a trailer which can be placed over the load to lift same, then be towed by any suitable vehicle.

The straddle carrier vehicle according to the present invention is advantageous in that the overall width of the vehicle can be the same as or narrower than the width of the load to be lifted.

I claim:

1. A straddle carrier vehicle in which the ground engaging wheels are pivoted about vertical axes between a longitudinal position and a transverse position and in which a locating mechanism is provided for disposing the wheels in either position, said wheels being steerable when in either position, the locating mechanism comprising a series of pairs of relatively rotatable coupled plates each mounted on top of a vertical shaft which carries a ground-engaging wheel, one plate of each pair being fixedly connected to the shaft and being integral with a spur gear, the other plate being fixedly mounted relative to the vehicle chassis and having power means which, when operated, rotates the spur gear to rotate the shaft-plate and thus the shaft and its wheel, and a stop for arresting movement of the shaft-plate when it reaches the longitudinal or transverse wheel position.

2. A straddle carrier vehicle as claimed in claim 1, in which the steering is controlled via a steering selector mechanism comprising a pair of independently pivotal members one of which is connected with the front pair of wheels and the other with the rear pair of wheels, a pair of members fixed relative to the vehicle and stop members mounted on pivotal plates which, when actuated together, lock either one of the pivotal members relative to a said fixed member, thereby to lock a said pair of ground-engaging wheels against steering action and thus provide two-wheel steering or to lock both pivotal members relative to each other so that they move together to provide four-wheel steering.

3. A straddle carrier vehicle having front and rear pairs of ground engaging wheels, a pair of individually pivotal members one of which is connected to the front pair of wheels and the other of which is connected to the rear pair of wheels, a pair of swingable members, means for swinging the swingable members in opposite directions relative to each other selectively into any of three positions in which said swingable members respectively prevent one or the other or both of said pivotal members from pivoting thereby selectively to permit two wheel steering by means of the front wheels or the rear wheels or four wheel steering of the vehicle, and fixed abutment means engageable with said swingable members in each of said three positions.

4. A straddle carrier vehicle having ground-engaging wheels, rotatable vertical shafts on which the wheels are carried, means for rotating the shafts, stop means for automatically arresting the rotation of the shafts when the wheels reach longitudinal or transverse position, said stop means comprising slide means rotatable with the shafts, means defining recesses fixed relative to the vehicle, one said recess being individual to each of said longitudinal and transverse positions, said slide means being in alignment with one of said recesses in each of said longitudinal and transverse positions, and means urging the slide means into the aligned recess in each of said longitudinal and transverse positions.

5. A straddle carrier vehicle as claimed in claim 4, said means for rotating each shaft comprising a pair of gears one rotatable with the associated shaft, said urging means comprising a pivotal and slidable connection between said one gear and said slide means.

References Cited by the Examiner

UNITED STATES PATENTS

| | | | |
|---|---|---|---|
| 1,289,296 | 12/18 | Stebbins et al. | 280—91 |
| 1,577,559 | 3/26 | Budd | 280—91 |
| 2,001,647 | 5/35 | Alt | 280—91 |
| 2,410,965 | 11/46 | Dimick | 214—392 |
| 2,598,570 | 5/52 | Lewis | 212—14 |
| 2,848,246 | 8/58 | Ruf | 280—91 |
| 3,006,427 | 10/61 | Van Der Lely. | |
| 3,018,116 | 1/62 | Summers et al. | 280—91 |
| 3,075,603 | 1/63 | Baudhuin | 214—394 X |
| 3,087,564 | 4/63 | Quayle. | |
| 3,097,717 | 7/63 | Gilvarry et al. | 180—79.2 X |
| 3,107,103 | 10/63 | Van Der Lely | 280—87 |

FOREIGN PATENTS 482,944  2/17  France.

BENJAMIN HERSH, *Primary Examiner.*

HUGO O. SCHULZ, A. HARRY LEVY, *Examiners.*